(No Model.) 2 Sheets—Sheet 1.

T. A. WILLARD.
AUTOMATIC SWITCH FOR STORAGE BATTERY USE.

No. 516,038. Patented Mar. 6, 1894.

Witnesses
M. F. Bragdon
Wm H. Husted

Inventor
Theodore A. Willard
by Wm N. Moore
Attorney (No Model.)　　　　　　　　　　　　　　　　2 Sheets—Sheet 2.
T. A. WILLARD.
AUTOMATIC SWITCH FOR STORAGE BATTERY USE.

No. 516,038.　　　　　　　　　　　Patented Mar. 6, 1894.

Witnesses　　　　　　　　　　　　　　Inventor

UNITED STATES PATENT OFFICE.

THEADORE A. WILLARD, OF NORWALK, OHIO.

AUTOMATIC SWITCH FOR STORAGE-BATTERY USE.

SPECIFICATION forming part of Letters Patent No. 516,038, dated March 6, 1894.

Application filed July 1, 1893. Serial No. 479,409. (No model.)

*To all whom it may concern:*

Be it known that I, THEADORE A. WILLARD, a citizen of the United States, and a resident of Norwalk, county of Huron, State of Ohio, have invented certain new and useful Improvements in Automatic Switches for Storage-Battery Use, of which I hereby declare the following to be a full, clear, and exact description, such as will enable others skilled in the art to which it appertains to make and use the same.

My invention relates to an automatic cut-out or charging switch, for use in connection with storage batteries or accumulators, and is especially adapted to employment with a current generator of irregular action and power, which is liable to stoppage at frequent or unforeseen intervals; such as, a dynamo actuated by windmill or water power, or an engine driving other machinery.

My invention is designed to introduce increased magnetic attraction and repulsion in the armature of the cut-out, to employ the minimum amount of current to actuate the electro-magnets thereof, to introduce an automatic rheostat or alarm to indicate a low current, and the invention further consists in the combination and arrangement of parts and construction of details, as hereinafter described, shown in the accompanying drawings and more specifically pointed out in the claims.

Figure 1:
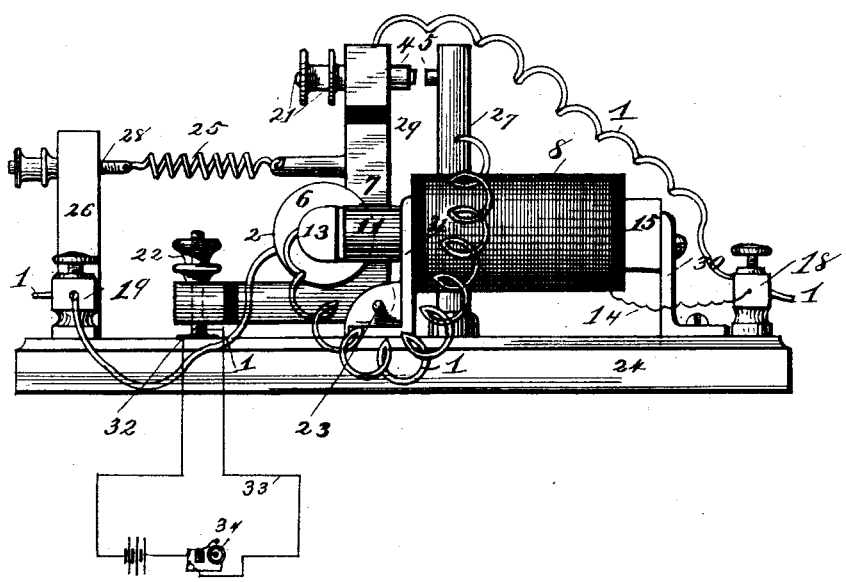
Figure 2:
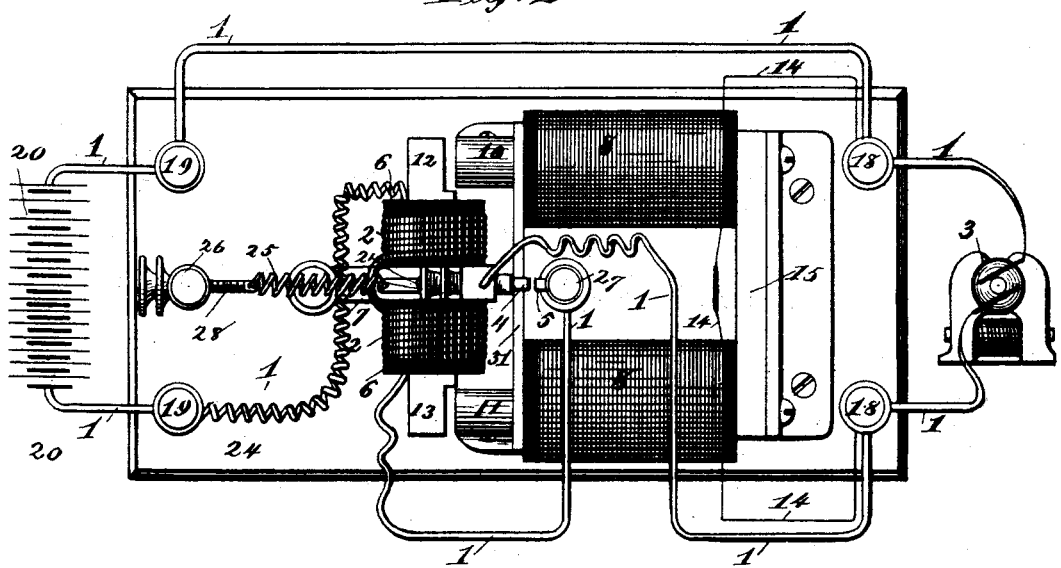
Figure 3:
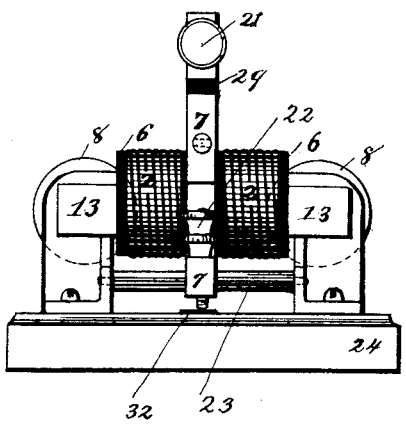
Figure 4:
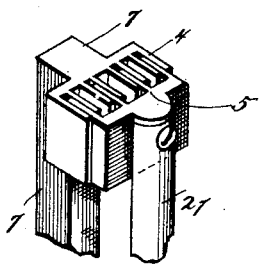

In the accompanying drawings Figure 1 shows a side view of the device. Fig. 2 shows a plan view of the same. Fig. 3 shows an end view with binding posts removed. Fig. 4 is a view of a contact device, employing an enlarged contact surface.

In the figures 1, 1, represents the main circuit wire, originating in the generators 3 and passing in coils 2 over the spools 6, 6, placed upon the armature crank or lever 7, in such a manner that the current is continuous when the contacts 4 and 5 are in engagement.

8, 8, are electro-magnets provided with stationary armature bars of soft iron, provided in turn with the two poles 10 and 11, adapted to engage the poles 12 and 13 of the soft iron armature wound at 2 by the coarse wire which carries the main current. The electro-magnets 8, 8, are wound with extremely fine wires of high resistance which are charged by means of the shunt circuit wires, 14, 14, derived from the main circuit directly from the dynamos or generator. The soft iron cores of these magnets are secured together by the yoke piece 15.

18 and 19 are the binding posts for the main current wire, 18 being the connections of the circuit with the dynamo 3, and 19 the connections with the storage battery or accumulator 20. The lever 7 supports, as stated, the armature provided with poles 12 and 13, on which is coiled the coarse wire of the main circuit; also at the upper extremity is placed the contact screw 21, the extremity of which (4) is composed of platinum or other conducting metal. The set screw 22 is placed on the lower arm to adjust the length of movement of the lever on its pivot 23. The thrust of the screw is received upon a piece of platinum or other metal 32, which is fastened to the stand or bed plate 24, which supports all the parts of the device. The spring 25, connecting the upper part of the lever with a rigid post (26) serves to retain the contacts (4), upon the screw point, and 5 upon the post (27) (in which the end of the main wire is inserted) apart, and separates the poles 10 and 11 of the electro magnets 8, 8, from the poles 12 and 13 of the armature, when no current is flowing through the main wire. This spring can be readily adjusted by means of the set screw (28), passing through the post (26).

29 is an insulating strip on the upper arm of the lever 7 to keep the current from the main part of the switch.

The main wire 1 is flexible and connects the posts (18) and (19) on one side of the device while at the same time it connects the posts (19) and (27) on the other side, after entering the coils 2, and the upper arm of armature crank or lever and post (18).

(30) and (31) are brass supports for the electro-magnets 8, 8.

At (32) is shown a metal plate which, with the screw (22) forms contact points for the short battery circuit (33), on which is placed the alarm (34) consisting of a bell; (or a red lamp could be lighted by a shunt from the main circuit) to call immediate attention to the apparatus when the power of the generator is too low to continue charging the batteries. Or an automatic rheostat could be placed in this circuit which will withdraw resistance as the batteries become charged and become stronger, thereby letting in more current to offset the increased back pressure from the batteries. The mode of operation of the device is as follows: The current from the dynamo or generator passes directly to the posts (18, 18,) where a small portion thereof is shunted through the fine wire circuit (14) into the electro-magnets (8, 8) which are so wound by the fine wire as to make the extremities of the cores (10) and (11) of opposite polarity when the current passes through the magnets. Also the coils (2, 2,) of coarse wire on the main circuit are so wound as to give the armature extremities (12) and (13) relatively opposite polarity to the cores (10) and (11), so that if the pole (10) is north, the pole (12) will be south, and the pole 11 will be south with the opposite pole (13) north respectively. It will be seen that when the dynamo is in action, a portion of the current will pass into the shunt circuit (14) and as soon as it reaches a strength greater than that of the batteries (20) it will excite the magnets (8, 8,) bearing the cores (10) and (11), which will attract the armature, bearing poles (12) and (13), drawing back the lever (7), until the contact points (4) and (5) are in engagement, where they will remain so long as the strength of the current is maintained from the dynamos to the batteries. But when from any cause the main current weakens and the battery commences to discharge back upon the dynamo, the contacts (4), and (5), will separate at once and cut off the current. This separation is caused by a reversal of the direction of current in the spools (2, 2,) which reverses the polarity of the armature at (12) and (13), so that the pole 12 will become the same polarity as (10), and the pole (13) the same as (11), and hence a double repulsion will occur to throw back the lever (7) and separate the contacts (4) and (5).

It will be obvious that the coils (2, 2,) being in series with the main wire (1) would have their poles reversed when traversed by a battery current toward the dynamo, but the electro-magnet being shunt wound, would remain of the same polarity whether the current came from the dynamo or from the storage battery. In cut-outs for this purpose heretofore known, a simple electro-magnet has been employed with an armature of soft iron and the attraction off-set by means of a spring. The objection however, found in this arrangement is that if from any cause the spring failed to work or became weak, the battery would keep up the attraction and retain the lever supporting the armature in engagement with the magnet until the battery had entirely discharged itself, or nearly so, a difficulty obviated by the device described.

Another advantage of the device is seen in the slight amount of current deviated from the main line to operate the electro-magnets, since a contact between the points (4) and (5) of only a fraction of a second, will make the poles (11 — 12) and (11 — 13) at once of opposite polarity to each other, and intensify the magnetic attraction to the amount of the main current flowing through the wire (1) and thus hold the contacts more firmly together, instead of weakening the magnetism, as in the common form of cut-out.

Having described my invention, what I claim as new, and desire to secure by Letters Patent, is—

1. In a cut-out, electro-magnets 8, wound with the fine wire of a shunt circuit 14, in combination with an armature therefor, provided with poles 12 and 13, and wound with coils in series with the main circuit 1, an armature lever 7 supporting said armature and pivoted at 23; contact points 4 and 5 adapted to close the main circuit when the electro-magnets attract the armature and spring adjustment 25 for said bell crank, substantially as and for the purposes set forth.

2. In a cut-out, electro-magnets mounted upon suitable supports, a lever or crank pivoted to oscillate in front of said magnets, and provided with an armature, a shunt coil about the magnets, a coil of coarse wire wound in series with the main circuit about the armature, and contact points 4 and 5 adapted to engage and close the main circuit when the armature is attracted by the electro-magnets, in combination with a stop screw upon the bell crank and contact plate upon the supporting stand, and an exterior battery circuit and alarm closed when the said contact screw and plate engage, substantially as described.

THEADORE A. WILLARD.

Witnesses:
WM. M. MONROE,
M. F. BRAGDON.